United States Patent
Lif et al.

(10) Patent No.: US 8,252,071 B2
(45) Date of Patent: *Aug. 28, 2012

(54) FUEL COMPOSITION CONTAINING A HYDROCARBON FRACTION AND ETHANOL

(75) Inventors: Anna Lif, Skarhamn (SE); Sara Olsson, Nosund (SE)

(73) Assignee: Akzo Nobel N.V., Arnhem (NL)

( * ) Notice: Subject to any disclaimer, the term of this patent is extended or adjusted under 35 U.S.C. 154(b) by 1116 days.

This patent is subject to a terminal disclaimer.

(21) Appl. No.: 12/118,998

(22) Filed: May 12, 2008

(65) Prior Publication Data

US 2008/0307699 A1    Dec. 18, 2008

Related U.S. Application Data

(63) Continuation of application No. 10/433,344, filed as application No. PCT/SE01/02748 on Dec. 12, 2001, now Pat. No. 7,575,607.

(30) Foreign Application Priority Data

Dec. 15, 2000   (SE) .................................. 0004648

(51) Int. Cl.
C10L 1/18 (2006.01)
C10L 1/22 (2006.01)

(52) U.S. Cl. ........................... 44/301; 44/302
(58) Field of Classification Search ............... 44/301, 44/302

See application file for complete search history.

(56) References Cited

U.S. PATENT DOCUMENTS

| | | |
|---|---|---|
| 1,525,578 A | 2/1925 | Friesenhahn |
| 2,194,496 A | 3/1940 | Christensen |
| 3,527,581 A | 9/1970 | Brownawell et al. |
| 4,002,438 A | 1/1977 | Fleming |
| 4,208,190 A | 6/1980 | Malec |
| 4,297,107 A | 10/1981 | Boehmke |
| 4,384,872 A | 5/1983 | Kester et al. |
| 4,392,866 A | 7/1983 | Sung et al. |
| 4,400,178 A | 8/1983 | Hoke |
| 4,451,265 A | 5/1984 | Schwab |
| 4,477,258 A | 10/1984 | Lepain |
| 4,504,275 A | 3/1985 | Baker |
| 4,504,276 A | 3/1985 | Baker |
| 4,732,576 A | 3/1988 | Friedrich et al. |
| 5,298,038 A | 3/1994 | Hashimoto et al. |
| 5,792,223 A | 8/1998 | Rivas et al. |
| 6,107,369 A | 8/2000 | Gupta et al. |

FOREIGN PATENT DOCUMENTS

| | | |
|---|---|---|
| EP | 089 147 A2 | 9/1983 |
| EP | 0 116 197 B1 | 8/1984 |
| EP | 0 117 915 A2 | 9/1984 |
| EP | 0 319 060 A2 | 6/1989 |
| EP | 0 475 620 A2 | 3/1992 |
| EP | 0 946 685 B1 | 10/1999 |
| EP | 1 027 410 B1 | 8/2000 |
| EP | 1 196 513 B1 | 4/2002 |
| JP | 48103604 | * 12/1973 |
| WO | WO 83/00344 | 2/1983 |
| WO | WO 88/04311 | 6/1988 |
| WO | WO 89/07637 | 8/1989 |
| WO | WO 93/24593 | 12/1993 |
| WO | WO 95/02654 | 1/1995 |
| WO | WO 95/05437 | 2/1995 |
| WO | WO 99/35215 | 7/1999 |
| WO | WO 00/31216 | 6/2000 |
| WO | WO 01/18154 A1 | 3/2001 |
| WO | WO 01/38462 A1 | 5/2001 |

OTHER PUBLICATIONS

International Search Report for International Application No. PCT/SE01/02748, Mar. 26, 2002.
Lewis, Sr., Richard J.; Hawley's Condensed Chemical Dictionary 13th Ed., John Wiley & Sons, New York, 1997 (p. 1066).
Abstract of BR PI9804481-8.
Abstract No. 1980-46387C for German Patent Application No. 2854540, Jun. 1980.
Abstract No. 1974-63694V for Japanese Patent No. JP 48-103604, Dec. 1973.
Derwent Abstract No. 1983-19166K for Japanese Patent No. JP 58008793A, Jan. 1983.

* cited by examiner

Primary Examiner — Cephia D Toomer
(74) Attorney, Agent, or Firm — Norris McLaughlin & Marcus PA

(57) ABSTRACT

The invention relates to an aqueous fuel composition having a homogeneous liquid phase, a so called microemulsion, containing a liquid hydrocarbon fraction, ethanol and an additive with an emulsifying and solubilizing ability. The composition comprises a) 70-95% by weight of an hydrocarbon fraction having a boiling point within the range from 130 to 425° C., b) 2-25% by weight of ethanol, c) 0.002-0.8% by weight of water, and d) 0.2-25% by weight of an additive comprising 5-100% by weight of an nitrogen-containing surfactant, such as an amine surfactant, an ether amine surfactant, an amine oxide surfactant and an amido surfactant, and optionally an alcohol having a hydrocarbon group of 5-24 carbon atoms. Preferably the additive comprises 5-90% by weight of the nitrogen-containing surfactant and 10-95% by weight of the alcohol. The composition, which can be stored for long periods, may be used as a fuel in diesel engines.

13 Claims, No Drawings

FUEL COMPOSITION CONTAINING A HYDROCARBON FRACTION AND ETHANOL

This application is a continuation of U.S. patent application Ser. No. 10/433,344 filed May 30, 2003, issued as U.S. Pat. No. 7,575,607 on Aug. 18, 2009, which claims priority of PCT Application No. PCT/SE01/02748, filed Dec. 12, 2001, and Swedish Patent Application No. 0004648-2, filed Dec. 15, 2000.

The present invention relates to an aqueous fuel composition having a homogeneous liquid phase, a so called microemulsion, containing a liquid hydrocarbon fraction, ethanol and an additive with an emulsifying and solubilizing ability.

In order to diminish the dependency on mineral oil, which is a non-renewable source of energy, mixed compositions, e.g. for use as fuels for internal combustion engines have been developed. In many of these fuel compositions a part of the hydrocarbon fraction has been replaced with water-containing ethanol or anhydrous ethanol. Diesel oil and anhydrous ethanol form solutions when blended but the presence of even a very low amount of water will cause a separation into a hydrocarbon phase and an ethanol/water phase. At lower temperatures the tendency of phase separation increases essentially. It is therefore important to maintain the fuel in a homogeneous liquid phase over the entire temperature range at which the fuel can be exposed.

During the years a large number of methods have been suggested to increase the stability of a mixed fuel containing aqueous ethanol and hydrocarbons. Thus, EP-A1-89 147 discloses a macroemulsion comprising liquid hydrocarbons, ethanol and water and as an emulsifier a polyetherpolystyrene block copolymer. However, the stability of such emulsions is limited and even minor separations may cause disturbances when starting or running an internal combustion engine, or may cause increased emissions, for example of CO and organic substances, when burnt.

EP-A1-475 620 discloses a microemulsion diesel fuel containing a hydrocarbon fraction, water and optionally also ethanol. In order to form a microemulsion between the water phase and the hydrocarbon fraction, a blend of a hydrophilic surfactant and a lipophilic surfactant is added, in particular a mixture of a sulfonate and an ethoxylate. This fuel needs large amounts of surfactants and is furthermore rather sensitive to temperature variations.

The Derwent abstract, accession number 1983-19166K, week 8308, 58008793, describes the use of $C_3$ or higher monohydric alcohols, such as octanol and decanol, in mixed fuels containing ethanol and a hydrocarbon fuel oil. Although these alcohols have a high capacity of forming microemulsions over a large temperature range, the fuels obtained have poor lubrication and a corrosive effect.

In U.S. Pat. No. 4,504,276 a surfactant composition suitable for the emulsification of methanol or ethanol in a hydrocarbon liquid is described, the surfactant composition being a blend of i) a block or graft copolymer and ii) a salt of an aliphatic amino compound and a long-chain aliphatic carboxylic acid. In the blends 15 to 18 the salts contain amino compounds having an aliphatic group within the range from 8-18 carbon atoms. However, in all working examples where any of the blends 15-18 was used as an emulsifier, macroemulsions were formed, which will separate upon storage.

The Brazilian patent Application PI9804481-8 describes an additive composition for mixed ethanol and hydrocarbon fuels to improve the tolerance of the fuels to humidity and dispersed water and to improve the stability. The additive composition comprises from 90-100% of at least two compounds selected from the classes consisting of
a) fatty acids with 12 to 20 carbon atoms,
b) specific polyamines,
c) specific fatty esters of polyoxyalkylene glycols,
d) certain compounds containing hydrophilic and lipophilic sites, and
e) certain cetane index activating substances.

The mixed fuels in the working examples seem to be macroemulsions.

It has now been found that the above mentioned drawbacks of the prior art fuel compositions can be essentially avoided by a fuel composition having a homogeneous liquid phase, a microemulsion, containing
a) 70-95%, preferably 75-92%, by weight of a hydrocarbon fraction having a boiling point within the range from 130 to 425° C.,
b) 2-25%, preferably 5-15%, by weight of ethanol,
c) 0.002-1.2%, preferably 0.002%-0.8%, and most preferably 0.005-0.4%, by weight of water, and
d) 0.2-25%, preferably 0.5-15%, by weight of an additive comprising
i) 5-100%, preferably 5-90% and most preferably 10-50%, by weight of a nitrogen-containing surfactant of the formula

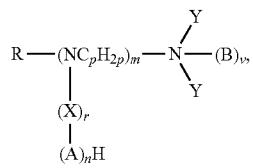 (I)

where A is an alkyleneoxy group of 2-3 carbon atoms, n is 0-4, p is a number from 2-3, m is from 0-3,
R is an aliphatic group or an acyl group of 8-22, preferably 12-20, carbon atoms or the group $R_2O(A)_nR_3$, where $R_2$ is an aliphatic group of 8-22 carbon atoms, $R_3$ is the group $C_pH_{2p}$, where p has the meaning mentioned above, or the group $CH_2CH(OH)CH_2$ and A and n have the meanings mentioned above,
Y is an alkyl group of 1-4 carbon atoms or the group $(A)_nH$, where A and n have the meanings mentioned above,
B is the group→O and v is 0 or 1 provided that when v is 1 then Y cannot be hydrogen, X is the group

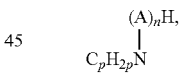

where A, p and n have the meanings mentioned above and r is 0-2, with the proviso that when m is 0, r must be 0; the sum of all n in formula I being 0-5, and
ii) 0-95%, preferably 10-95% and most preferably from 50-90%, by weight of an alcohol of the formula

ROH                                (II), where R is a hydrocarbon group having 5-24, preferably an aliphatic group of 8-14, carbon atoms.

The fuel composition of the present invention is stable in a large temperature interval and the mixture of the liquid hydrocarbon fraction, ethanol and water are present in a homogeneous phase, a microemulsion, even at low temperatures. Therefore, the composition can be stored for long periods within the temperature interval without any risk for phase separation. Since the mixture of the liquid hydrocarbon fraction, ethanol and water has the form of a microemulsion and not the form of a macroemulsion, there is no need for an addition of a stabilizing polymer such as the block or graft polymer disclosed in U.S. Pat. No. 4,504,276. The composition may advantageously be used as a fuel, especially as a fuel for internal combustion engines, which quite often can be subjected to large variations in temperature.

For example, microemulsions between the hydrocarbon ethanol and water can be established at temperatures far below −20° C., although in many cases the existence of a microemulsion down to 5° C. or 0° C. may be satisfactory. In addition, the composition of the present invention has excellent anticorrosive and lubricating properties and these properties have been confirmed in diesel engine tests. It is believed that the properties depend on the presence of the nitrogen-containing surfactants, which via the nitrogen atoms are weakly attached to the metallic surfaces, for example in a diesel engine. The hydrophobic part of the surfactant can then impart lubrication and corrosion-inhibiting properties.

The additive has a good capability to form clear solutions (microemulsions) between the hydrocarbon fraction ethanol and water. At high temperatures, for instance between 5° C. and 25° C., the amount of the additive needed to achieve a microemulsion is low in relation to the amount of ethanol and water. At lower temperatures, for instance between −5° C. to −25° C., the amount of the additive has to be increased or as an alternative the amount of ethanol and/or water has to be reduced.

Examples of suitable surfactants of formula I are amine surfactants with formulae

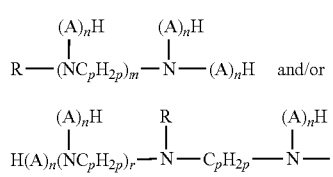

where R is an aliphatic group having 8-22 carbon atoms, A is an alkyleneoxy group having 2-3 carbon atoms, p is 2 or 3, preferably 3, m is 0-3, and n is 0-4, the sum of all n being 0-5, and r is 1 or 2, or
an amine oxide surfactant of the formula

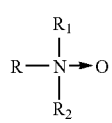

where R is an aliphatic group having 8-22 carbon atoms and $R_1$ and $R_2$ are an alkyl group having 1-4 carbon atoms, preferably methyl, or a hydroxyalkyl group having 2-4 carbon atoms, for example hydroxyethyl; or a mixture of any one of the surfactants defined in Ia, Ib or Ic.

Other suitable examples of surfactants of formula I are ether amine surfactants of the formula

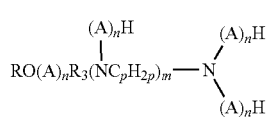

where R is an aliphatic group of 8-22 carbon atoms and $R_3$, A, n, p and m have the same meanings as in formula I. Especially preferred compounds are those where R is an aliphatic group of 12-20 carbon atoms, p is 3, m is 0-2 and n is 0-2; the sum of all n being 0-2.

Still other examples of suitable surfactants of formula I are amide surfactants of the formula

where R is an acyl group of 8-22, preferably 12-20, carbon atoms, m is 0-2, n is a number from 0-2, the sum of all n being 0-2, and A and p have the same meanings as in formula I. Preferably p is 3 and m is 1.

According to the invention it may often be favourable to combine compounds from the different groups. Thus, combinations of alcohols of formula II and nitrogen-containing surfactants of formula I, such as surfactants of formulae Ia, Ib, Ic, Id and Ie, have in tests shown a high solubilizing effect. Preferably the amount of the alcohol of formula II is from 10-95%, more preferably 50 to 90%, by weight and the nitrogen-containing surfactant of formula I from 5-90%, preferably 10-50%, by weight of the combination. Examples of such combinations are an alcohol of formula II, where R preferably is an aliphatic group of 8-13 carbon atoms, combined with a compound of formula Ia, where m is 0 or 1, R is an aliphatic group of 16-20 carbon atoms and $\Sigma$ n is 1-5, a compound of formula Ib, where r is 1, or a compound with formula Id, where n is 0 and $R_3$ is $C_3H_6$.

The alcohol of formula II can be alkyl substituted phenols, such as oktylphenol, dioktylphenol, nonylphenol and dinonylphenol. Due to environmental reasons alcohols containing aliphatic groups are preferred. The aliphatic groups have normally 5-22, preferably 8-14, carbon atoms.

Examples of suitable alcohols of formula II, where R is an aliphatic group, are n-octanol, isooctanol, primary alcohols being branched in second position, such as 2-ethylhexanol, 2-propylheptanol and 2-butyloctanol, decanol, dodecanol, methyl-branched $C_9$-$C_{13}$ alcohols, palm fatty alcohols, rape seed fatty alcohols, coco nut fatty alcohols and tallow fatty alcohols. In the compounds of formulae Ia, Ib, Ic and Id, the group R can be an aliphatic group derived from the above mentioned fatty alcohols, oleyl, 2-ethylhexyl, isooctyl, n-octyl, n-decyl, 2-propylheptyl, 2-butyloctyl and methyl-substituted alkyl groups with 9-13 carbon atoms. The acyl groups in formula Ie are suitably acyl group derived from fatty acids or synthetic acids, such as decanoic, dodecanoic, palm fatty acid, coco nut fatty acids, rape seed fatty acids and tallow fatty acids.

In the formula I the symbols m and r are preferably 0 or 1 and 1, respectively. The symbol n is preferably 0, when m is 0 and R is an aliphatic group of 8-14 carbon atoms. When m is 1-3, r is 1-2 and R is an aliphatic group with 15-22, preferably 16-20, carbon atoms, then the sum of all n is preferably 1-5. The alkyleneoxy group A is preferably ethyleneoxy, although one or more of the A groups may be a propyleneoxy group in order to adjust the HLB-value of the compound or the mixture.

Besides the essential components the composition may also contain other conventional additives, such as corrosion inhibitors, viscosity improving agents, lubrication improving additives, cetan number increasing additives, surface-tension reducers and ignition improving agents as well as other solubilizers. The presence of peroxide compounds may also affect the stability of the present composition.

The present invention is further illustrated by the following working examples.

EXAMPLES

Fuel compositions according to the present invention as well as a number of comparison fuel compositions were produced by mixing a hydrocarbon fraction suitable to be used as a diesel fuel, an aqueous ethanol and an emulsifying and solubilizing additive. The additives added were as follows.

TABLE I

Additives used in the Examples

| Reference No. | Additive |
|---|---|
| 1 | Formula Ia, R = coco alkyl, n = O, m = O |
| 2 | Formula Ia, R = tallow alkyl, Σ n = 2, m = O, A = ethyleneoxy |
| 3 | Formula Ia, R = tallow alkyl, Σ n = 3, m = 1, A = ethyleneoxy |
| 4 | Formula Ic, R = coco alkyl $R_1$ = $R_2$ = methyl |
| 5 | Formula Ia, R = oleyl, Σ n = 2, m = O, A = ethyleneoxy |
| 6 | Formula Ia, R = coco alkyl, Σ n = 2, m = 0, A = propyleneoxy |
| 7 | Formula II, R = 2-ethylhexyl |
| 8 | Formula Ie, R = oleoyl, p = 3, A = ethyleneoxy, n = 1 and 0, Σ n = 1, m = 1 |
| 9 | Formula II, R = dodecyl |
| 10 | Formula II, $C_9$-$C_{11}$ alcohol |
| 11 | Formula Ia, R = coco alkyl, Σ n = 2, m = 0, A = ethyleneoxy |
| 12 | $C_{12}$-$C_{16}$-alcohol ethoxylated with 2 moles of ethylene oxide per mole of alcohol |
| 13 | Formula Ib, R = tallow alkyl, r = 1 and Σ n = 0 |
| 14 | Formula Id, R = 2-ethylhexyl, n = 0, m = 0, $R_3$ = $C_3H_6$ |
| 15 | Formula Id, R = decyl, n = 0, m = 0, $R_3$ = $C_3H_6$ |
| 16 | Formula Id, R = $C_8C_{10}$-alkyl, n = 0, m = 0, $R_3$ = $C_3H_6$ |
| 17 | Formula Id, R = tetradecyl, n = 0, m = 1, P = 3 |
| 18 | Formula Id, R = 2-ethylhexyl, n = 1, Σ n = 1, A = propyleneoxy attached to a nitrogen atom, m = 0, $R_3$ = $C_3H_6$ |
| 19 | $C_3H_6OH$ |
| 20 | $C_{11}H_{23}O(C_2H_4O)_2H$ |

Example 1

The fuel composition was prepared by mixing an aqueous alcohol containing 0.04% by weight of water a hydrocarbon fraction having a boiling point range from 180° C. to 295° C. and an additive. The amounts of the hydrocarbon fraction, pure ethanol, water content and additive is disclosed in Table II. The cloud points of the fuel compositions were determined. Results obtained are also shown in Table II.

TABLE II

Fuels based on ethanol containing 0.04% water

| Composition | Additive No. | Hydrocarbon fraction | Ethanol | Additive | Water | Cloud point ° C. |
|---|---|---|---|---|---|---|
| A | — | 100 | — | — | — | −36 |
| B | — | 89.8 | 10.2 | — | 0.0041 | −2 |
| C | 19 | 88.0 | 10.0 | 2.0 | 0.0040 | >−10 |
| D | 12 | 88.0 | 10.0 | 2.0 | 0.0040 | −10 |
| E | 20 | 88.0 | 10.0 | 2.0 | 0.0040 | −10 |
| F | 7 | 88.0 | 10.0 | 2.0 | 0.0040 | −25 |
| G | 10 | 88.0 | 10.0 | 2.0 | 0.0040 | −28 |
| H | 9 | 88.0 | 10.0 | 2.0 | 0.0040 | −28 |
| 1 | 1 | 88.0 | 10.0 | 2.0 | 0.0040 | −28 |
| 2 | 2 | 88.0 | 9.7 | 2.3 | 0.0039 | −23 |
| 3 | 3 | 89.0 | 8.0 | 3.0 | 0.0032 | −25 |
| 4 | 4 | 88.0 | 10.0 | 2.0 | 0.0046 | −25 |
| 5 | 6 | 88.0 | 10.0 | 2.0 | 0.0040 | −25 |
| 6 | 10 2 | 88.1 | 9.7 | 1.6 0.6 | 0.0039 | −31 |
| 7 | 7 11 | 88.3 | 9.7 | 1.8 0.2 | 0.0039 | −29 |
| 8 | 11 | 88.0 | 9.8 | 2.2 | 0.0039 | −23 |
| 9 | 7 5 | 88.0 | 10.0 | 1.0 1.0 | 0.0040 | −24 |
| 10 | 7 5 | 87.0 | 10.0 | 1.5 1.5 | 0.0040 | −36 |

From the results it is evident that the compositions 1-9 according to the invention even at very low temperatures form homogeneous, stable phase between the hydrocarbon fraction, ethanol and water. These compositions are therefore suitable to be used as diesel fuels.

Example 2

In the same manner as in Example 1, a number of compositions were tested in order to evaluate their suitability to be used as a diesel fuel. The hydrocarbon fraction used in these compositions had a boiling point range from 159-360° C. and a cloud point of −12° C. due to precipitation in the hydrocarbon fraction. The compositions tested and the results obtained are disclosed in Table III below.

TABLE III

| Composition | Additive No. | Hydrocarbon fraction | Ethanol | Additive | Water | Cloud point ° C. |
|---|---|---|---|---|---|---|
| I | — | 90 | 10.0 | — | 0.04 | 0 |
| K | — | 100 | — | — | — | −12 |
| 11 | 2 | 90 | 10.0 | 2.0 | 0.04 | −12 |
| 12 | 8 | 90 | 10.0 | 2.0 | 0.04 | −12 |
| 13 | 4 | 90 | 10.0 | 2.0 | 0.04 | −12 |
| 14 | 6 | 90 | 10.0 | 2.0 | 0.04 | −12 |

From the results it is evident that the presence of an additive according to the invention results in the formation of a homogeneous phase below 0° C. Since the hydrocarbon fraction forms preciptations at −12° C. it is not possible to determine the actual cloud point depending on the presence of water and ethanol below −12° C. by this method.

Example 3

Fuel compositions based on the hydrocarbon fraction of Example 1 were prepared according to Table IV below. The cloud points of the different compositions were determined and results obtained are also shown in Table IV.

TABLE IV

Composition containing ethanol having 0.07% water

| Composition | Additive No. | Hydrocarbon fraction | Ethanol | Additive | Water | Cloud point °C. |
|---|---|---|---|---|---|---|
| L | 7 | 88.0 | 10.0 | 2.0 | 0.007 | −21 |
| 15 | 5 | 88.0 | 10.0 | 2.0 | 0.007 | −18 |
| 16 | 14 | 87.8 | 10.2 | 2.0 | 0.007 | −16 |
| 17 | 15 | 88.0 | 10.0 | 2.0 | 0.007 | −20 |
| 18 | 16 | 88.0 | 10.0 | 2.0 | 0.007 | −20 |
| 19 | 17 | 88.0 | 10.0 | 2.0 | 0.007 | −20 |
| 20 | 1 | 88.0 | 10.0 | 2.0 | 0.007 | −20 |
| 21 | 8 | 88.0 | 10.0 | 2.0 | 0.007 | −12 |
| 22 | 15 + 7 | 88.0 | 10.0 | 1.0 + 1.0 | 0.007 | −22 |
| 23 | 16 + 7 | 88.0 | 10.0 | 1.0 + 1.0 | 0.007 | −22 |
| 24 | 17 + 7 | 88.0 | 10.0 | 1.0 + 1.0 | 0.007 | −22 |
| 25 | 1 + 7 | 88.0 | 10.0 | 0.5 + 1.5 | 0.007 | −22 |
| 26 | 13 + 7 | 88.0 | 10.0 | 0.5 + 1.5 | 0.007 | −22 |
| 27 | 18 + 7 | 87.6 | 10.4 | 0.5 + 1.5 | 0.007 | −20 |
| 28 | 17 + 7 | 83.0 | 15.0 | 0.5 + 1.5 | 0.011 | −12 |
| 29 | 1 + 7 | 83.0 | 15.0 | 0.5 + 1.5 | 0.011 | −12 |
| 30 | 13 + 7 | 83.0 | 15.0 | 0.5 + 1.5 | 0.011 | −12 |
| 31 | 17 + 7 | 78.0 | 20.0 | 0.5 + 1.5 | 0.014 | 0 |
| 32 | 1 + 7 | 78.0 | 20.0 | 0.5 + 1.5 | 0.014 | 0 |
| 33 | 13 + 7 | 78.0 | 20.0 | 0.5 + 1.5 | 0.014 | 0 |

From the test it is evident that the fuel compositions have the ability to form microemulsions down to 0° C. At lower addition of alcohol the cloud points will be essentially lowered.

Example 4

Fuel compositions according to the invention were prepared by using ethanol containing 1% by water. The hydrocarbon fraction was the same as in Example 1. The compositions and their cloud points are shown in the Table V below.

TABLE V

Fuel compositions

| Composition | Additive No. | Hydrocarbon fraction | Ethanol | Additive | Water | Cloud point °C. |
|---|---|---|---|---|---|---|
| 34 | 17 + 7 | 87.4 | 10.5 | 0.5 + 1.6 | 0.1 | 5 |
| 35 | 1 + 7 | 87.4 | 10.5 | 0.5 + 1.6 | 0.1 | 5 |
| 36 | 13 + 7 | 87.4 | 10.5 | 0.5 + 1.6 | 0.1 | 5 |
| 37 | 19 + 7 | 87.4 | 10.5 | 0.5 + 1.6 | 0.1 | 5 |

From the test it is evident that at a water content of about 0.1% and an ethanol content of just over 10%, the fuel compositions are present as microemulsions down to 5° C.

Example 5

Fuel compositions according to the invention were prepared with aqueous alcohol containing 2% water. The hydrocarbon fraction was the same as in Example 1. The compositions and their cloud points are shown in Table VI below.

TABLE VI

Fuel containing ethanol with 2% water

| Composition | Additive No. | Hydrocarbon fraction | Ethanol | Additive | Water | Cloud point °C. |
|---|---|---|---|---|---|---|
| 38 | 17 + 7 | 89.8 | 8.2 | 0.5 + 1.5 | 0.16 | 15 |
| 39 | 1 + 7 | 89.8 | 8.2 | 0.5 + 1.5 | 0.16 | 15 |
| 40 | 13 + 7 | 89.8 | 8.2 | 0.5 + 1.5 | 0.16 | 15 |

From the results it is evident that an increasing amount of water also noticeably increases the cloud point.

Example 6

Five fuel compositions containing a hydrocarbon fraction of Example 1 or Example 2 and an ethanol having 0.07% by weight of water were prepared and their lubricating properties were evaluated by the High-Frequency Reciprocating Rig (HFFR) according to ASTM D 6079-99. The compositions and the results obtained are shown in Table VII below.

TABLE VII

Compositions and lubrication

| Composition | Additive No. | Hydrocarbon fraction Ex 1 | Hydrocarbon fraction Ex 2 | Ethanol | Additive | Lubrication μm |
|---|---|---|---|---|---|---|
| M | — | 100.0 | — | — | — | 375 |
| N | — | 90.0 | — | 10.0 | — | 386 |
| O | — | — | 100.0 | — | — | 374 |
| 41 | 7 + 5 | 87.4 | — | 10.0 | 1.3 + 1.3 | 364 |
| 42 | 7 + 5 | — | 88.0 | 10.0 | 1.0 + 1.0 | 313 |

The results obtained clearly illustrate that the fuel compositions 41 and 42 according to the invention have excellent lubricating properties.

The invention claimed is:

1. A composition having a homogeneous liquid phase comprising
   a) 70-95% by weight of a hydrocarbon fraction having a boiling point of from 130° C. to 425° C.,
   b) 2-25% by weight of ethanol,
   c) 0.002% to 1.2% by weight of water, and
   d) 0.2% to 25% by weight of an additive, said additive comprising
   i) 5% to 90% of a nitrogen-containing surfactant of the formula

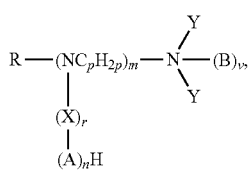

(I)

where A is an alkyleneoxy group of 2-3 carbon atoms, n is 0-4, p is a number from 2-3, m is from 0-3,
R is an aliphatic group or an acyl group of 8-22 carbon atoms or the group $R_2O(A)_nR_3$, where $R_2$ is an aliphatic group of 8-22 carbon atoms, $R_3$ is the group $C_pH_{2p}$, where p has the meaning mentioned above, or the group $CH_2CH(OH)CH_2$ and A and n have the meanings mentioned above, provided that if R is an acyl group of 8 to 22 carbon atoms, then said nitrogen containing surfactant will have the formula

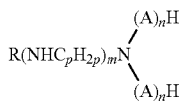
(Ie)

wherein m is 1, n is a number from 0-2, the sum of all n being 0-2 and p is 3,

Y is an alkyl group of 1-4 carbon atoms or the group $(A)_nH$, wherein A and n have the meanings mentioned above, B is the group →O and v is 0 or 1 provided that when v is 1 then Y cannot be hydrogen, X is the group

wherein A, p and n have the meanings mentioned above and r is 0-2, provided that when m is 0, r must be 0; the sum of all n in formula I being 0-5, and ii) 10 to 95% by weight of an alcohol of the formula

ROH (II), wherein R is a hydrocarbon group having 5-24 carbon atoms.

2. A composition according to claim 1 wherein R in formula II is an aliphatic group of 8-14 carbon atoms.

3. A composition according to claim 1 wherein the surfactant of formula I is an amine surfactant of the formulae

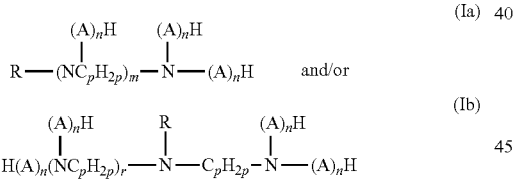

wherein R is an aliphatic group having 8-22 carbon atoms, A is an alkyleneoxy group having 2-3 carbon atoms, p is 2 or 3, m is 0-3, and n is 0-4, the sum of all n being 0-5, and r is 1 or 2, or an amine oxide surfactant of the formula

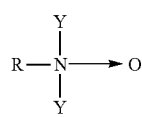
(Ic)

wherein R is an aliphatic group having 8-22 carbon atoms and Y is an alkyl group of 1-4 carbon atoms or the group $(A)_nH$, wherein A has the meaning mentioned above and n is 1; or a mixture of any one of the surfactants defined in Ia, Ib or Ic.

4. A composition according to claim 1 wherein the surfactant of formula I is an amide surfactant of the formula

(Ie)

wherein R is an acyl group of 8-22 carbon atoms, m is 1, n is a number from 0-2, the sum of all n being 0-2, and wherein A is an alkyleneoxy group of 2-3 carbon atoms and p is a number 3.

5. An additive for use as an emulsifier and solubilizer comprising i) 5% to 90% by weight of a surfactant of the formula

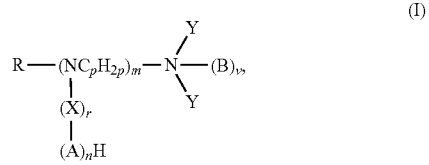
(I)

wherein A is an alkyleneoxy group of 2-3 carbon atoms, n is 0-4, p is a number from 2-3, m is from 0-3, R is an aliphatic group or an acyl group of 8-22 carbon atoms or the group $R_2O(A)_nR_3$, wherein $R_2$ is an aliphatic group of 8-22 carbon atoms, $R_3$ is the group $C_pH_{2p}$, where p has the meaning mentioned above, or the group $CH_2CH(OH)CH_2$ and A and n have the meanings mentioned above, Y is an alkyl group of 1-4 carbon atoms or the group $(A)_nH$, wherein A and n have the meanings mentioned above, provided that if R is an acyl group of 8 to 22 carbon atoms, then said nitrogen containing surfactant will have the formula

(Ie)

wherein m is 1, n is a number from 0-2, the sum of all n being 0-2 and p is 3, B is the group →O and v is 0 or 1 provided that when v is 1 then Y cannot be hydrogen, X is the group

wherein A, p and n have the meanings mentioned above and r is 0-2, with the proviso that when m is 0, r must be 0; the sum of all n in formula I being 0-5; and ii) about 10-% to about 95% by weight of an alcohol of the formula

ROH (II), wherein R is a hydrocarbon group having 5-24 carbon atoms.

6. An additive according to claim 5 wherein the amount of i) is 10% to 50% by weight and the amount of ii) is 50% to 90% by weight.

7. A composition according to claim 1 wherein R in formula I is an aliphatic group or an acyl group of 12 to 20 carbon atoms.

8. A method for producing a mixed fuel with a homogeneous liquid phase of aqueous ethanol and hydrocarbons comprising adding an emulsifier and stabilizer to the mixed fuel, said emulsifier and stabilizer comprising:
   i) about 5% to about 90% by weight of a nitrogen-containing surfactant of the formula

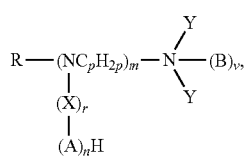  (I)

wherein A is an alkyleneoxy group of 2-3 carbon atoms, n is 0-4, p is a number from 2-3, m is from 0-3,
R is an aliphatic group or an acyl group of 8-22 carbon atoms or the group $R_2O(A)_nR_3$, where $R_2$ is an aliphatic group of 8-22 carbon atoms, $R_3$ is the group $C_pH_{2p}$, wherein p has the meaning mentioned above, or the group $CH_2CH(OH)CH_2$ and A and n have the meanings mentioned above, provided that if R is an acyl group of 8 to 22 carbon atoms, then said nitrogen containing surfactant will have the formula

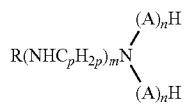  (Ie)

wherein m is 1, n is a number from 0-2, the sum of all n being 0-2 and p is 3,
Y is an alkyl group of 1-4 carbon atoms or the group $(A)_nH$, where A and n have the meanings mentioned above,
B is the group →O and v is 0 or 1 provided that when v is 1 then Y cannot be hydrogen, X is the group

wherein A, p and n have the meanings mentioned above and r is 0-2, with the proviso that when m is 0, r must be 0; the sum of all n in formula I being 0-5, and
ii) 10 to about 95% by weight of an alcohol of the formula

ROH  (II), where R is a hydrocarbon group having 5-24 carbon atoms.

9. The method of claim 8 wherein the surfactant of formula I is an amine surfactant of the formulae

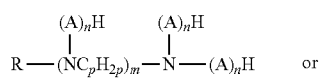  (Ia)

or

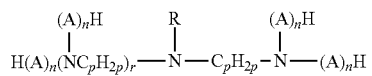  (Ib)

wherein R is an aliphatic group having 8-22 carbon atoms,
A is an alkyleneoxy group having 2-3 carbon atoms, p is 2 or 3, m is 0-3, and n is 0-4, the sum of all n being 0-5, and r is 1 or 2,
or
an amine oxide surfactant of the formula

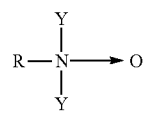  (Ic)

wherein R is an aliphatic group having 8-22 carbon atoms and Y is an alkyl group of 1-4 carbon atoms or the group $(A)_nH$, wherein A has the meaning mentioned above and n is 1; or a mixture of any one of the surfactants defined in Ia, Ib or Ic.

10. The method according to claim 8 wherein the amount of i) is from about 10% to about 50% by weight and the amount of ii) is about 50% to about 90% by weight.

11. A method of increasing the stability of a mixed fuel by adding an emulsifier and stabilizer to the mixed fuel to form a homogeneous liquid phase wherein the mixed fuel comprises
   a) a hydrocarbon fraction having a boiling point within the range from 130° C. to about 425° C.,
   b) ethanol, and
   c) water;
   and wherein the emulsifier and stabilizer comprises
   i) 5% to 90% of a nitrogen-containing surfactant of the formula

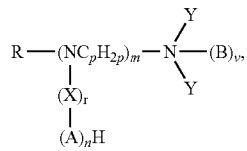  (I)

where A is an alkyleneoxy group of 2-3 carbon atoms, n is 0-4, p is a number from 2-3, m is from 0-3,
R is an aliphatic group or an acyl group of 8-22 carbon atoms or the group $R_2O(A)_nR_3$, where $R_2$ is an aliphatic group of 8-22 carbon atoms, $R_3$ is the group $C_pH_{2p}$, where p has the meaning mentioned above, or the group $CH_2CH(OH)CH_2$ and A and n have the meanings mentioned above, provided that if R is an acyl group of 8 to 22 carbon atoms, then said nitrogen containing surfactant will have the formula

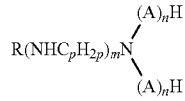  (Ie)

wherein m is 1, n is a number from 0-2, the sum of all n being 0-2 and p is 3,

Y is an alkyl group of 1-4 carbon atoms or the group $(A)_nH$, where A and n have the meanings mentioned above, B is the group →O and v is 0 or 1 provided that when v is 1 then Y cannot be hydrogen, X is the group

where A, p and n have the meanings mentioned above and r is 0-2, provided that when m is 0, r must be 0; the sum of all n in formula I being 0-5, and ii) 10 to about 95% by weight of an alcohol of the formula $$ROH \quad (II),$$

where R is a hydrocarbon group having 5-24 carbon atoms.

12. The method of claim 11 wherein the emulsifier and stabilizer is added in an amount such the homogeneous liquid phase comprises 70% to about 95% by weight of the hydrocarbon fraction, 2% to 25% by weight of the ethanol, 0.002% to 1.2% by weight of the water, and 0.2% to 25% by weight of the emulsifier and stabilizer.

13. The method according to claim 12 wherein the amount of i) is about 10% to about 50% by weight and the amount of ii) is 50% to 90% by weight.

* * * * *